Figure 1:
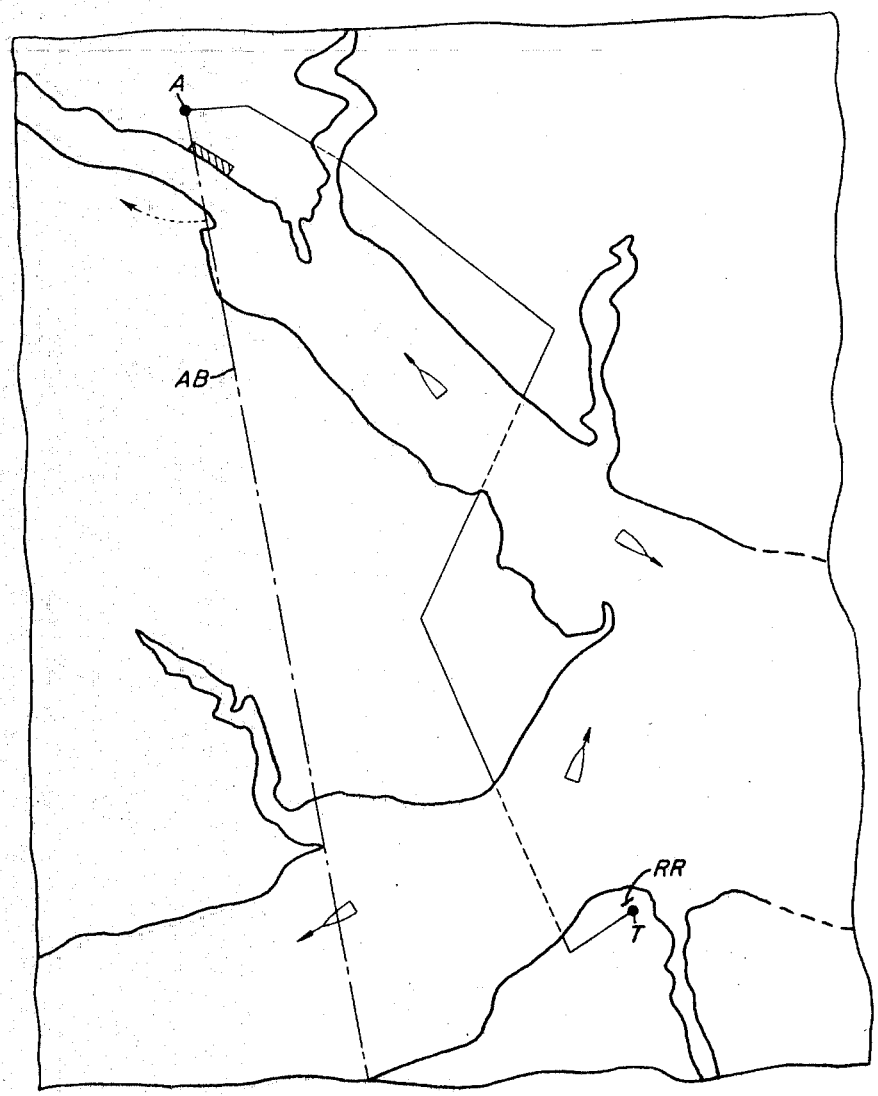

Jan. 10, 1967      N. N. P. SMITH      3,298,022
              RADIO NAVIGATION AIDS
Filed March 29, 1965                    2 Sheets-Sheet 1

INVENTOR
Norman Neville Parker Smith
BY Baldwin & Wight
ATTORNEYS

United States Patent Office 3,298,022
Patented Jan. 10, 1967

3,298,022
RADIO NAVIGATION AIDS
Norman Neville Parker Smith, Billericay, Essex, England, assignor to The Marconi Company Limited, London, England, a British company
Filed Mar. 29, 1965, Ser. No. 443,217
8 Claims. (Cl. 343—6)

This invention relates to radio navigation aids and is at present primarily intended for marine use for ship harbor surveillance. As will be apparent later, however, it could be used for aiding air navigation and notably for airport control purposes. Although in the present specification, the invention will be particularly described in connection with its at present primary intended purpose, namely to ship navigation, it is not limited thereto and the word "harbor" is used herein, where the context admits, in a broad sense to include airports and their approaches as well as ship harbors and their approaches.

It is well known to provide harbors, estuaries and other local areas liable to be congested with craft, with high quality radar equipments, commonly called Harbor Surveillance Radars (hereinafter termed Harbor Radars) to enable the Harbor control officials to observe the movements of craft in the area surveyed and by radio telephone to assist the captains of such craft to navigate safely in conditions of bad visibility even though the craft in question—or some of them—may not themselves be equipped with radar. Such harbor radars usually have plan position indication displays which include rotating line markers showing the changing momentary directions of the rotating directional aerials of the radars.

In order to make a harbor radar of greater service to craft in its area the P.P.I. picture it produces may be televised by a television camera and the resultant signals broadcast over the surveyed area so that craft therein may use simple and cheap television receivers to reproduce the P.P.I. picture obtained at the harbor radar station. Such televised P.P.I. pictures are obviously most helpful to the craft—especially to those not equipped with their own radars—but the information they provide still falls far short of safe navigational requirements in that they do not themselves provide means whereby the captain of any particular craft can identify it in the televised picture he receives. One way in which an individual craft could overcome this difficulty would be by performing some more or less complex maneuver— such as making a number of alterations of course and/or speed—and observing which of the craft representations in the televised picture executes the same maneuver, but obviously this is slow to practice, and often undesirable, or dangerous or even impractical. Other methods of overcoming the difficulty, proposed in British Patent No. 640,903 (Radio Corporation of America) for the navigation assistance of aircraft, is to transmit, by television, a Radar derived P.P.I. picture of the positions of aircraft in the area with, superimposed thereon, a map of the service area and a rotating strobe line rotating in synchronism with the rotating aerial of the Radar, receiving the televised picture by a television receiver in a co-operating aircraft and varying the brilliance of the picture either by receiving the radar pulses and integrating them to produce an integrated pulse which varies the brilliance or receiving a radar pulse and using it to trigger a multivibrator to produce a pulse at least as long as a television frame and applying the same to the grid of the television reproducer tube. A further proposal contained in the said British Patent No. 640,903 consists in providing a ground station which scans the service area with a pulsed directional beam, re-transmitting the pulses from a radar beacon on a co-operating aircraft, receiving the re-transmitted pulses at the ground station incorporating them in a P.P.I. display there, transmitting from the ground station a television picture of the display including also a map of the service area and a strobe line rotating in synchronism with the scanning aerial producing the pulse beam and receiving the televised picture in the aircraft, said aircraft having means for synchronously keying the re-transmitting beacon and the television receiver so that the representations of all aircraft in the received picture except that of the aircraft in question are caused to flicker. These proposals have, however, the defect of being complex and expensive and, moreover, if the after-glow in the television receiver tube is long enough to give a good television picture, the practical resolution i.e. the accuracy of identification of an individual target in the picture, will be well below that which is desirable to give safe identification of a particular target if there are, (as there are apt to be in busy harbors) a number of them fairly close together. Further the proposals identify a target by what is in effect identifying a position line on which it is situated as distinct from dentifying it by identifying an actual postion.

The present invention seeks to enable craft in a Radar surveyed area to obtain their positions in a simple and convenient manner with the aid of apparatus, in the harbor installation, which is relatively simple and cheap and with the aid of apparatus in the moving vehicle which is of a simple and satisfactory nature.

According to a feature of this invention a radio navigation aid for use on a moving vehicle comprises in combination a television receiver adapted to receive a transmitted television picture of a display produced by a pulsed harbor radar, said transmitted picture being radiated from a pre-determined point which is geographically spaced from the harbor radar and being composed of modulated television lines the line excursions of which occur in predetermined time relation to the pulses transmitted by the said harbor radar, means responsive to the passage through said vehicle of the space scanning radio beam of said radar for indicating the instant of said passage, and means for including in the displayed picture produced by said television receiver, pulses received from said harbor radar.

According to another feature of this invention a harbor radar installation adapted for use in co-operation with radio navigation aids in accordance with the main feature of this invention comprises pulsed radar equipment adapted to scan a pre-determined area and to produce a P.P.I. display of said area, said display including an angularly moving marker moving in synchronism with the scanning directional aerial of said equipment, a television camera mounted and arranged to view said display, and a television transmitter adapted to broadcast over said area from a pre-determined point which is geographicaly spaced from the point from which the radar pulses are transmitted, television signals utilizable for reproduction of said display, said camera being arranged to make television line excursions in pre-determined time relation with the radar pulses transmitted and said radar equipment having at least one operating characteristic whereby the signal it transmits can be readily distinguished from those transmitted from a normal vehicle-borne radar transmitter.

Preferably the television transmission is synchronized with the radar pulse transmission in such manner that each of a plurality of lines of television signals as transmitted commences in predetermined time relationship to the transmission of a pulse by the radar equipment.

It will be seen that with a harbor installation in which each of a plurality of lines of television signals as transmitted commences synchronously with the transmission of a pulse by the radar equipment, a co-operating mobile receiver will receive each transmitted radar pulse at a time during a line excursion which depends on the relation between its distance from the point of radar transmission and its distance from the point of television transmission. It is, therefore, simple so to arrange matters that, if these two distances are equal, each received radar pulse will produce a displayed dot half way along a television line in the received reproduced television picture. If this is done and the vehicle is on a straight line perpendicularly bisecting a line joining the points of television and radar transmission, the received reproduced television picture will show a straight line of indicia extending at right angles to the scanning lines and half-way along them. If the vehicle is in some other position not equidistant from the television and radar transmission points, there will again appear in the received reproduced television picture a straight line of indicia which extends at right angles to the scanning lines but will no longer be half way along them but in some other position depending on the difference between the distances of the vehicle from the two transmission points. The locus of positions having a given difference of distances from two fixed points is, of course, a hyperbola, the hyperbola of zero difference being the straight line perpendicularly bisecting a line between the two said points. It is therefore possible, with a given harbor installation, to prepare a graticule of hyperbolae to be positioned correctly over the received reproduced television picture, to prepare a hyperbola-identifying scale to co-operate with the line of indicia produced in the said picture by the reception of transmitted radar pulses, and to use the reading of the said scale as given by the position of the said line of indicia along the television lines to identify a hyperbolic position line on which the vehicle must be. Simultaneously a straight position line, obtained as set forth in the aforementioned British Patent by "following up" the angularly moving marker in the picture until a radar pulse is received, constitutes a second position line intersecting the hyperbolic position line (one special case of which is also a straight line) and thus a "fix" is obtainable. Obviously the harbor installation must be such that the position lines intersect with a useful angle of cut.

In one way of carrying out this invention, therefore, a radar navigation aid for use in a moving vehicle is provided, in association with the received reproduced television picture, with a graticule of lines each of which is the locus of points having the same difference between its distance from the point of television transmission and its distance from the point of radar transmission, and, also associated with said television picture, a scale adapted and positioned to be read by a line of indicia produced in said picture by reception of radar pulses, for identifying the different lines in said graticule.

Instead of providing a separate graticule of lines for use of the vehicle and/or instead of providing a separate scale for use on the vehicle to be read by the aforesaid line of indicia an equivalent pattern of lines and/or an equivalent scale may be incorporated by normal known "video mapping" technique, in the television picture as transmitted. If this is done, and both a pattern of lines and a scale are so incorporated, the vehicle-borne television receiver will reproduce a picture showing the harbor with a pattern of superimposed identifiable hyperbolic lines (for example numbered lines), a corresponding identifying scale, and a moving marker originating at the representation of the radar transmitter. Across this picture will appear a line of indicia whose transverse position, i.e. whose position at right angles to its own length and along the scale, depends on the difference of the distances of the vehicle from the points of television and radar transmission. By providing a swinging cursor, centered on the representation of the point of radar transmission, and adapted to be swung across the picture to follow up the marker and providing an indicator, to be operated when a radar pulse is received, a quick and easy "fix" can be directly obtained by the intersection of the cursor with that one of the hyperbolic lines identified by the reading of the line of indicia on the scale. In practice, however, it is preferred to omit the swinging cursor as necessary, for, having employed the line of indicia to identify the hyperbolic line on which the craft lies, it is simple to watch the radial marker as it swings across the picture and note its point of intersection with the selected hyperbolic line at the time when an indicator (e.g. a lamp) operated by reception of a radar pulse, is actuated. In this connection it should be noted that all that is required is for the point of intersection to identify for the observer in a craft the representation of his own craft in the picture presented to him. With such an arrangement the required information is given directly by the picture itself and there is no cursor, graticule or other apparatus special to each harbor, to be provided in the craft.

Where a separate graticule of lines is employed it is advisable, in order to facilitate correct "lining up" of the graticule, to provide a powerful radar reflector at the point of television transmission so that this point, as well as the point of radar transmission, appears clearly and unambiguously in the received reproduced television picture in the moving vehicle.

Obviously, in carrying out this invention, it is necessary to ensure that interfering signals—for example pulses transmitted from other radars such as the radars of other craft in the neighborhood—shall not produce confusing displays in the received reproduced television pictures. As, however, it is pre-supposed that the desired radar transmission shall be distinguishable from interfering signals, e.g. that it shall be on a frequency different from that used for ordinary craft-borne radars—it is not thought that this will, in practice, present any insuperable difficulties. The carrier frequency employed for the surveillance radar installation should be chosen at a value selectable by the craft borne television receiver.

Figure 2:
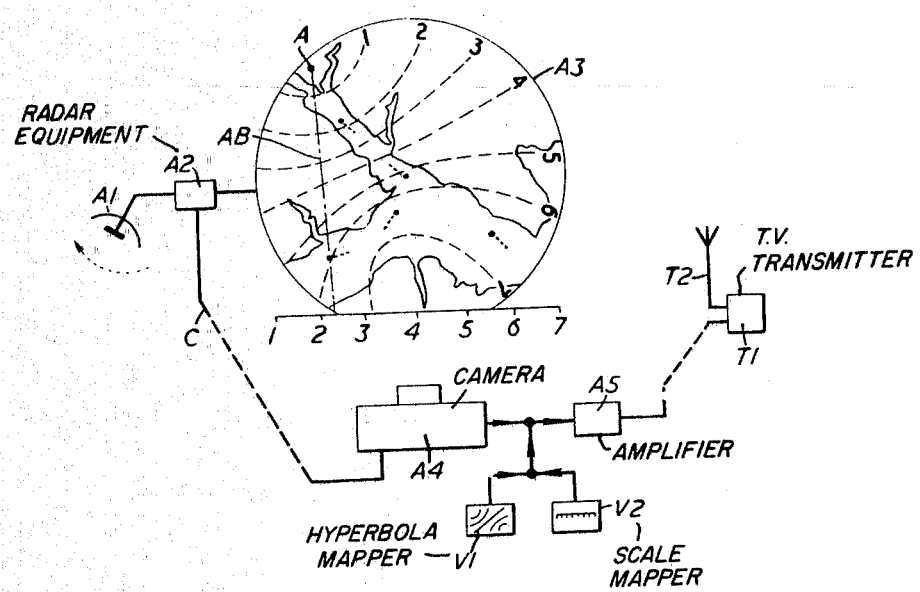
Figure 3:
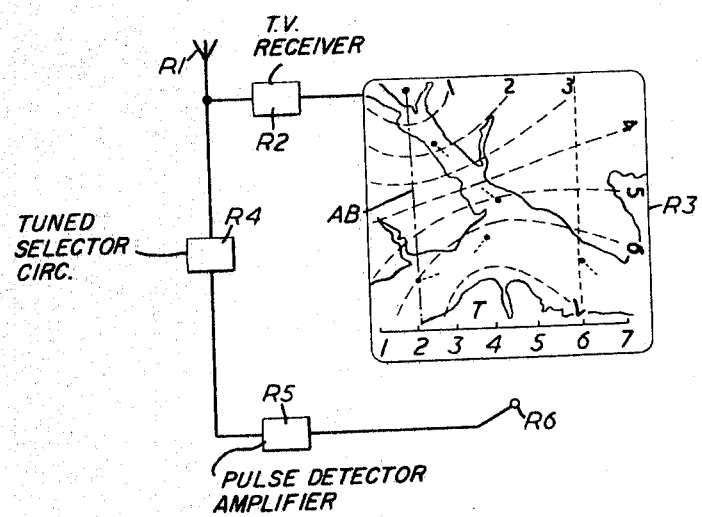

The invention is illustrated in the accompanying drawings in which FIG. 1 is a general schematic view of a ship harbor equipped in accordance with this invention; FIG. 2 is a simplified diagram showing the shore equipment provided; and FIG. 3 is a simplified diagram showing a preferred form of shipboard equipment in accordance with this invention.

Referring to the drawings FIG. 1 represents part of a harbor. At A is a harbor radar which surveys the harbor and its approaches by means of a rotating scanning directional radar beam represented by the chain line AB which rotates in the usual way at a constant pre-determined angular speed. The harbor radar produces a P.P.I. display of the surveyed area and the ships therein, the display having the usual line marker rotating in synchronism with the beam AB. The carrier frequency employed for the harbor radar is chosen at a value adequately different from the standardized carrier frequency used for shipborne radars to avoid confusion therewith. The P.P.I. display produced by the harbor radar is "viewed" by a television camera and transmitted from a television transmitting aerial T situated well away from A in a position such that the perpendicular bisector of the line AT makes good angles of cut with the line marker AB in all its possible navigationally useful positions over the surveyed area. The camera is so constructed and operated that television line scanning therein is synchronised with radar pulse transmission from A, each successive transmitted pulse occurring simultaneously with the half-way point of a television scan line of signals as transmitted. Preferably the radar pulse repetition frequency is a sub-multiple of the television line frequency though, theoretically the two frequencies could be the same. Superimposed upon the television signals transmitted are signals corresponding to a pattern of hyperbolic lines each of which is the locus of points in the surveyed area having a given difference of distance from A and T, together with means, such as numbers adjacent the ends of the pattern lines, to identify them. Also superimposed upon the television signals transmitted are signals corresponding to a scale positioned near one edge of the picture and extending in a direction parallel to the line direction, this scale having a length equal to the length of one television line and carrying numbers corresponding to the hyperbolic line numbers. So-called video mapping technique, as well known per se, may be used to generate and superimpose the hyperbolic line and scale signals.

Shown at RR in FIG. 1 is the powerful radar reflector which is utilized when a separate graticule of lines is employed for centering such separate graticule.

FIG. 2 is a schematic diagram which includes a representation of the installation at A and T. The harbor radar comprises the usual rotating directional scanning aerial A1 with which is associated a radar transmitter and receiver equipment A2 the video signal output from which is fed to a display cathode ray tube A3 to produce a radar display in the customary way. This display includes a rotating line marker (represented by a chain line AB) indicative of the momentary direction of the aerial A1. The line marker of course rotates about the point, in the display, corresponding to the geographical position of the aerial A1. In the particular arrangement envisaged in FIG. 2 this said point is offset, in well known manner, with respect to the centre of the display—it is actually quite close to the edge thereof—but obviously this is not necessary and the position of the said point may be chosen anywhere in the display in accordance with practical requirements and with due regard to the location and configuration of the waterways in the area to be surveyed.

The picture produced by the tube A3 is viewed by a television camera A4 the line scanning in which is synchronised with pulse transmission from A in such manner that each transmission of a pulse from A commences at the time of transmission of the mid-point of one of a plurality of scan lines of television signals as transmitted from T. The video output from the camera has superimposed thereon signals derived from known "video mapping" signal producers V1 and V2, one of which, V1, produces signals corresponding to a family of hyperbolae, with identifying numbers. For convenience of explanation such hyperbolae are indicated conventionally by the numbered broken lines in the representation at A3 in FIG. 2 though, of course, the radar picture produced on the tube A3 does not include such hyperbolae. The other signal producer V2 produces signals corresponding to corresponding numbered scale which will appear, extending in the line direction, near one edge of the television picture finally received. Such a scale is shown, again purely for convenience of explanation, near the bottom of the representation of A3. The necessary links between the radar station A and the television camera gear for synchronising line scanning with pulse transmission are represented conventionally at C. The superimposed signals which will provide, in the ultimately produced received television picture, the pattern of hyperbolic lines and the scale are developed and superimposed in any manner well known per se. As regards the signals providing the hyperbolic lines these are such that the central hyperbola, (No. 4 in FIG. 2) is the locus of points of equal distances from the points of radar and television transmission i.e. is a straight line perpendicularly bisecting the line A–T, while each of the other hyperbolae (there may be any number, depending on circumstances and convenience) is similarly the locus of points of the same difference of distance from A and T. As regards the signals providing the scale these are such that the overall scale length is equal to a television scanning line length, and parallel to the television line direction, the numbers on the scale dividing this length in accordance with the number of hyperbolic lines provided. Thus, in the example conventionally illustrated, the member 4 appropriate to the central (straight line) hyperbola, is half way along the scale.

It is to be noted that the order of the numerical members along the scale is determined only by the predetermined time relation of transmitted radar pulses to transmitted lines of television signal and that a synchronization of signals differing from the synchronization in the illustrated example would necessitate the use of a scale wherein the order of numerical members would be other than that illustrated.

The output from the camera unit A4, after amplification at A5, is fed to a television transmitter T1 which broadcasts the television signals over the surveyed area. The various parts of the equipment shown in FIG. 2 may be located wherever is convenient and linked as necessary by cabling or by radio links.

FIG. 3 shows the simple nature of the ship-borne equipment. It comprises a receiving aerial R1 which feeds into a television receiver R2 having a picture reproducer tube R3. The receiver R2 includes carrier frequency selective circuits, not separately shown, whereby television signals from T and radar pulses from A are selected with a minimum of interference from undesired signals and fed on for reproduction by the tube R3 the received radar pulses being employed as "brighten up" pulses. The aerial also feeds into a tuned selector circuit R4 which is selective of the carrier frequency of the harbor radar and which in turn feeds into a pulse responsive detector and amplifier R5 adapted to provide an output sufficient to flash a gas discharge or other low consumption indicator lamp R6 each time a pulse is received from the harbor radar. If desired, in order to ensure more certain operation and reduce the liability to false operation by interfering signals, the unit R5 may also include a circuit selectively responsive to the reception of a sequence of pulses at the radar pulse repetition frequency (which is a convenient sub-multiple of the television line frequency) and a relay actuated by said responsive circuit and adapted when actuated, to flash the lamp R6. This lamp is situated so as to be conveniently in sight while observing the screen of tube R3.

The use of this simple receiving apparatus is as follows: The picture reproduced by the tube R3 will be, as indicated, a picture of the harbor (showing among other things, the ships in the area each ship representation having the customary "tail" indicative of its track) with the hyperbolae and the scale forming part of the picture and including the marker AB swinging across it. When the radar beam from A sweeps across a ship there will appear, in each of a plurality of equally spaced reproduced television lines, a brightened dot caused by the reception, by the television receiver, of a radar pulse. Since the time of transmission of each pulse from A is synchronous with the time at which a line excursion (in the transmission from T, hereinbefore described) takes place, the point in such television line (at the receiver) at which this brightened dot occurs will depend upon the difference of the distances between the receiver and the points A and T. If this difference is zero the brightened dots will occur half way along each of the television lines in question. Accordingly each time the radar beam sweeps through the ship there will be produced a line (such as the line X in FIG. 3) of brightened dots extending across the picture at right angles to the television lines and the scale. This line is read off on the scale. In FIG. 3 the scale reading given by line X is 6. This gives the information that the ship is on hyperbola 6. Also each time the radar beam sweeps through the ship the lamp R6 flashes. Having found this hyperbolic position line, all the navigator has to do is to watch the next sweep of the marker AB across the picture and observe where it cuts the selected hyperbolic position line at the moment the lamp flashes. At this time the marker AB will pass through the representation of the navigator's ship and thus identify it for him in the picture. In FIG. 3 the identified ship is the one near the SW corner of the picture.

As already stated a radially movable cursor, or its equivalent, centered on the representation of the radar station A, could be provided to "follow up" the marker AB as described in the aforementioned British Patent, and the hyperbolic pattern of lines and/or the scale could be omitted from the television picture as transmitted and replaced by a specially prepared graticule and scale for placing over the reproduced television picture at the receiver. This, however, involves the provision of a specially prepared graticule and scale for each harbor and the necessity of accurately positioning them wth respect to the picture—not always an easy thing to do. For these reasons the illustrated arrangement is much preferred, for all necessary information is provided by the shore installation and is contained in the picture and pulses transmitted, the ship requiring only the simple television receiver radar pulse indicator (R6) and the associated relatively simple equipment, with nothing "special" to be provided in advance for any individual harbor. Obviously the radar pulse indicator (the lamp R6 in the illustrated embodiment) could take any of a variety of different forms not necessarily giving visual indication and an indicator giving indication by sound could be used. In one very convenient arrangement in which sound indication is given, reception or a radar pulse is caused to produce, in the television receiver, a signal which will pass through the sound receiving portion normally provided in an ordinary television receiver and thus to produce a recognisable "click" or other sound from its loud speaker.

I claim:

1. A navigation aid comprising radar means for transmitting and receiving radar pulses including a scanning directional aerial adapted to scan a given area, display means responsive to said radar means for producing a plan position indication display, said display means including means for producing in said display an angular moving marker moving in synchronism with the scanning directional aerial, a television camera arranged to view said display, television transmission means located a predetermined distance from said aerial and responsive to said camera for broadcasting said display over said given area, and means for synchronizing said camera and said radar means whereby the transmitted television signals are in predetermined time relation to the transmitted radar pulses.

2. A navigation aid as claimed in claim 1 wherein said radar pulses have unique characteristics, readily distinquishable from stray radar pulses.

3. A navigation aid as claimed in claim 1 wherein said radar means transmits a radar pulse at the time of transmission of the mid-point of a television scan line.

4. A navigation aid as claimed in claim 1 and further including vehicle-carried reception means for receiving and displaying said plan position indication display and said radar pulses, said pulses being displayed on said plan position indication display at a position determined by the distance of the vehicle from said aerial and said television transmission means.

5. A navigation aid as claimed in claim 4 wherein said vehicle-carried reception means includes means responsive to said radar pulses for indicating the presence of said pulses.

6. A navigation aid as claimed in claim 4 including means for producing in said display a set of lines each of which represents the locus of points having the same difference in distance from said antenna and from said television transmission means.

7. A navigation aid as claimed in claim 6 including means for producing in said display a scale of indicia corresponding to said lines, the position of said pulses with respect to said scale indicating the position of the vehicle with respect to said lines in the display.

8. A navigation aid as claimed in claim 1 including a radar reflector located at said television transmission means.

References Cited by the Examiner
UNITED STATES PATENTS

| | | | |
|---|---|---|---|
| 3,111,663 | 11/1963 | Stavis | 343—6 |
| 3,111,664 | 11/1963 | Gamertsfelder et al. | 343—6 |
| 3,121,223 | 2/1964 | Roberts et al. | 343—6 |

CHESTER L. JUSTUS, *Primary Examiner.*

P. M. HINDERSTEIN, D. C. KAUFMAN,
*Assistant Examiners.*